United States Patent
Yoon et al.

(10) Patent No.: US 11,332,396 B2
(45) Date of Patent: May 17, 2022

(54) METHOD OF DRIVING BALLAST WATER TREATMENT SYSTEM

(71) Applicant: NK CO., LTD., Busan (KR)

(72) Inventors: Seung Je Yoon, Busan (KR); Mi Hyun Oh, Busan (KR); Han Gong Kim, Busan (KR)

(73) Assignee: NK CO., LTD., Busan (KR)

( * ) Notice: Subject to any disclaimer, the term of this patent is extended or adjusted under 35 U.S.C. 154(b) by 0 days.

(21) Appl. No.: 16/758,267

(22) PCT Filed: Jul. 13, 2018

(86) PCT No.: PCT/KR2018/007949
§ 371 (c)(1),
(2) Date: Apr. 22, 2020

(87) PCT Pub. No.: WO2019/083128
PCT Pub. Date: May 2, 2019

(65) Prior Publication Data
US 2020/0339451 A1    Oct. 29, 2020

(30) Foreign Application Priority Data
Oct. 23, 2017 (KR) .......... 10-2017-0137725

(51) Int. Cl.
*C02F 1/78* (2006.01)
*B63J 4/00* (2006.01)
(Continued)

(52) U.S. Cl.
CPC .......... *C02F 1/78* (2013.01); *B63J 4/002* (2013.01); *C02F 1/008* (2013.01);
(Continued)

(58) Field of Classification Search
None
See application file for complete search history.

(56) References Cited

U.S. PATENT DOCUMENTS

| | | | |
|---|---|---|---|
| 2006/0027507 A1* | 2/2006 | van Leeuwen | C02F 1/78 210/760 |
| 2010/0181260 A1* | 7/2010 | Vroom | B63B 13/00 210/748.03 |
| 2015/0210564 A1* | 7/2015 | Inoue | B63J 4/002 250/438 |

FOREIGN PATENT DOCUMENTS

| | | |
|---|---|---|
| JP | 2008-200590 A | 9/2008 |
| KR | 20-0192932 Y1 | 8/2000 |

(Continued)

OTHER PUBLICATIONS

Youtube video, "NK O3 System Blueballast Water Treatment System", Oct. 15, 2015, pp. 1-6, Retrieved from the Internet: <URL:https://www.youtube.com/watch?v=n8W_rwwljFw>.

(Continued)

*Primary Examiner* — Richard C Gurtowski
(74) *Attorney, Agent, or Firm* — Sughrue Mion, PLLC

(57) ABSTRACT

The present invention relates to a method of driving a ballast water treatment system. The ballast water treatment system includes an air compressor for compressing air, an air receiver tank for storing the compressed air, an oxygen generator for generating oxygen from the air, an oxygen receiver tank for storing the oxygen, an ozone generator for generating ozone from the oxygen, a ballast water pump for pumping ballast water, an inflow line for transferring the ballast water, an ozone injector for injecting the ozone into the inflow line, and a destructor for purging the ozone. The driving method includes a step of pressing a stop button to stop the ballast water treatment system, a step of purging ozone generated in the ozone generator, and a step of stopping each device of the ballast water treatment system.

11 Claims, 4 Drawing Sheets

(51) Int. Cl.
*C02F 1/00* (2006.01)
*C02F 103/00* (2006.01)

(52) U.S. Cl.
CPC .. *C02F 2103/008* (2013.01); *C02F 2201/782* (2013.01); *C02F 2209/03* (2013.01); *C02F 2209/225* (2013.01); *C02F 2209/235* (2013.01); *C02F 2303/04* (2013.01)

(56) References Cited

FOREIGN PATENT DOCUMENTS

| KR | 10-2007-0102626 A | 10/2007 |
| KR | 10-0769834 B1 | 10/2007 |
| KR | 10-0802889 B1 | 2/2008 |
| KR | 10-1252577 B1 | 4/2013 |
| KR | 10-2016-0064453 A | 6/2016 |

OTHER PUBLICATIONS

Notice of Allowance issued from Korean Patent Application No. 10-2017-0137725 dated Nov. 2, 2018.
International Search Report for PCT/KR2018/007949 dated Oct. 16, 2018 (PCT/ISA/210).

\* cited by examiner

METHOD OF DRIVING BALLAST WATER TREATMENT SYSTEM

CROSS-REFERENCE TO RELATED APPLICATION

This application is a National Stage Entry of PCT International Application No. PCT/KR2018/007949, which was filed on Jul. 13, 2018, and which claims priority to Korean Patent Application No. 10-2017-0137725, filed on Oct. 23, 2017 in the Korean Intellectual Property Office, the disclosure of which is incorporated herein by reference.

TECHNICAL FIELD

The present invention relates to a method of driving a ballast water treatment system, and more particularly, to a method of driving a ballast water treatment system capable of preventing leakage of harmful gases.

BACKGROUND ART

In general, ballast water refers to freshwater or seawater for buoyancy adjustment that is filled in ballast tanks formed on both sides of the bottom of a ship to maintain the balance of the ship. Since freshwater or seawater used as ballast water contains various organisms such as pathogens and plankton, discharging ballast water into coastal regions without any treatment may lead to serious marine pollution and destruction of ecosystems.

Based on this situation, in 1996, in the United States, by establishing the national invasive species law, exotic species were defined as invaders and the management and control of ballast water became mandatory. In addition, in Australia, the quarantine law was amended. In accordance with the amendments, ballast water is defined as imported cargo subject to quarantine, and direct quarantine is conducted on ballast water. In addition, the International Maritime Organization (IMO) concluded an international agreement in February 2004. According to this agreement, a ship must be equipped with necessary equipment to sterilize ballast water starting in 2009, and in case of violation, the ship is completely prohibited from entering.

In recent years, the interest of countries around the world in preventing environmental pollution has increased. Furthermore, national efforts and regulations to prevent environmental pollution will be further strengthened in the future. Accordingly, in addition to treatment of ballast water, methods of economically and safely treating, in a ship, various wastewater or harmful gases generated during ship operation have been studied.

RELATED ART DOCUMENT

Patent Document

Korean Patent No. 10-0769834

DISCLOSURE

Technical Problem

Therefore, the present invention has been made in view of the above problems, and it is one object of the present invention to provide a method of driving a ballast water treatment system capable of preventing leakage of harmful gases.

Technical Solution

In accordance with one aspect of the present invention, provided is a method of driving a ballast water treatment system including an air compressor for compressing air; an air receiver tank for storing the compressed air; an oxygen generator for generating oxygen from the air; an oxygen receiver tank for storing the oxygen; an ozone generator for generating ozone from the oxygen; a ballast water pump for pumping ballast water; an inflow line for transferring the ballast water; an ozone injector for injecting the ozone into the inflow line; and a destructor for purging the ozone, the method including a step of pressing a stop button to stop the ballast water treatment system, and a step of purging ozone generated in the ozone generator, and a step of stopping each device of the ballast water treatment system.

In one embodiment of the present invention, the ballast water treatment system may further include an ozone generator gas valve for controlling a flow rate of the oxygen supplied from the oxygen receiver tank to the ozone generator, and the step of purging ozone may include a step of stopping generation of ozone by stopping the ozone generator; a step of, after the ozone generator is stopped, purging ozone that has previously been generated; a step of closing the ozone generator gas valve; and a step of stopping the oxygen generator.

In one embodiment of the present invention, the ballast water treatment system may further include a 3-way valve for providing ozone generated in the ozone generator to the ozone injector or the destructor, and in the step of purging ozone, the 3-way valve may be opened in a direction of the destructor and may be closed in a direction of the ozone injector so that ozone generated in the ozone generator is introduced into the destructor and is purged.

In one embodiment of the present invention, the ballast water treatment system may further include a first pressure gauge for measuring pressure of a fluid output from the air receiver tank, and the driving method may further include, after the oxygen generator and the air compressor are stopped, a step of measuring a first pressure of air output from the air receiver tank using the first pressure gauge.

In one embodiment of the present invention, subsequent steps may proceed only when the first pressure is 0.5 bar or less.

In one embodiment of the present invention, the driving method may further include a step of recognizing an emergency stop situation; and a step of shutting down and terminating the ballast water treatment system in a case of an emergency stop situation.

In one embodiment of the present invention, the ballast water treatment system may further include a first pressure gauge for measuring a pressure of a fluid output from the air receiver tank and a third pressure gauge for measuring a pressure of a fluid output from the ozone generator, and the step of recognizing an emergency situation may include a step of measuring an amount of ozone added to ballast water by the ozone injector (ozone amount measurement step); a step of measuring a concentration of ozone present in an atmosphere around the ballast water treatment system (ambient ozone concentration measurement step); a step of measuring a concentration of oxygen present in an atmosphere around the ballast water treatment system (ambient oxygen concentration measurement step); a step of measuring, using the first pressure gauge, a first pressure of air output from the air receiver tank (first pressure measurement step); and a step of measuring, using the third pressure gauge, a third pressure of ozone output from the ozone generator (third pressure measurement step).

In one embodiment of the present invention, in the ozone amount measurement step, upon determining that the amount of ozone is out of a predetermined range for more than a predetermined period of time, the situation may be recognized as an emergency situation, and the step of performing shutdown may proceed.

In one embodiment of the present invention, in the ambient ozone concentration measurement step, when the concentration of ozone is greater than a predetermined value for more than a predetermined period of time, the situation may be recognized as an emergency situation, and the step of performing shutdown may proceed.

In one embodiment of the present invention, in the ambient oxygen concentration measurement step, when the concentration of oxygen s out of a predetermined range for more than a predetermined period of time, the situation may be recognized as an emergency situation, and the step of performing shutdown may proceed.

In one embodiment of the present invention, in the first pressure measurement step, when the pressure of air is less than a predetermined value for more than a predetermined period of time, the situation may be recognized as an emergency situation, and the step of performing shutdown may proceed.

In one embodiment of the present invention, in the third pressure measurement step, when the pressure of ozone is out of a predetermined range for more than a predetermined period of time, the situation may be recognized as an emergency situation, and the step of performing shutdown may proceed.

Advantageous Effects

According to embodiments of the present invention, a ballast water treatment system includes an air compressor for compressing air, an air receiver tank for storing the compressed air, an oxygen generator for generating oxygen from the air, an oxygen receiver tank for storing the oxygen, an ozone generator for generating ozone from the oxygen, a ballast water pump for pumping ballast water, an inflow line for transferring the ballast water, an ozone injector for injecting the ozone into the inflow line, and a destructor for purging the ozone. In the method of driving a ballast water treatment system, as a general case, when the ballast water treatment system is stopped by pressing a stop button, generated ozone is purged in a predetermined order. Accordingly, the ballast water treatment system can be safely operated without problems such as leakage of ozone.

In addition, an emergency stop situation can be recognized by measuring certain factors, and the ballast water treatment system can be properly shut down when emergency stop is required, so that the ballast water treatment system can be safely operated.

However, the effects of the present invention are not limited to the above-described effects, and may be broadly extended without departing from the spirit and scope of the present invention.

BEST MODE

Hereinafter, preferred embodiments of the present invention will be described in detail with reference to the accompanying drawings.

Since the present invention may be applied with various modifications and may have various embodiments, exemplary embodiments and drawings of the present invention are intended to be explained and exemplified. However, these exemplary embodiments and drawings are not intended to limit the embodiments of the present invention to particular odes of practice, and all changes, equivalents, and substitutes that do not depart from the spirit and technical scope of the present invention should be understood as being encompassed in the present invention.

Figure 1:
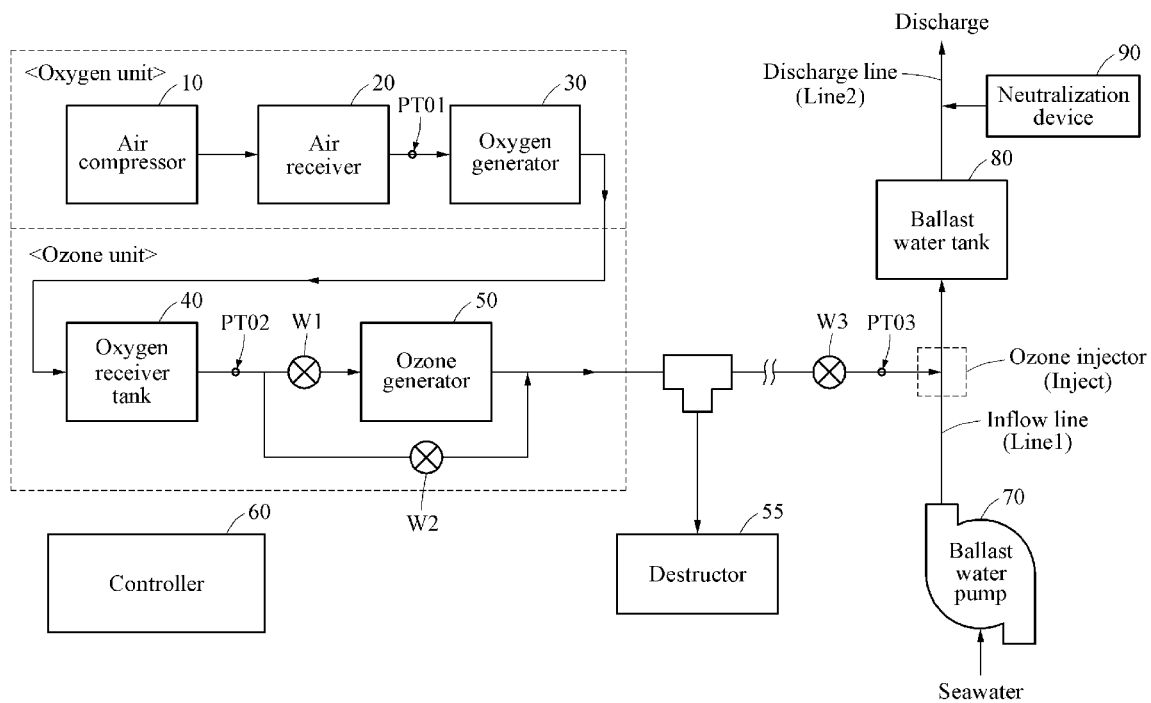
FIG. 1 is a block diagram showing a ballast water treatment system according to one embodiment of the present invention.

FIG. 1 is a block diagram showing a ballast water treatment system according to one embodiment of the present invention.

Referring to FIG. 1, the ballast water treatment system may include an air compressor 10, an air receiver tank 20, an oxygen generator 30, an oxygen receiver tank 40, an ozone generator 50, a controller 60, a ballast water pump 70, a ballast water tank 80, a neutralization device 90, an ozone injector (INJECT), an inflow line (LINE1), a discharge line (LINE2), a destructor 55, and a 3-way valve (3W).

The ballast water treatment system may further include a first pressure gauge (PT01), a second pressure gauge (PT02), a third pressure gauge (PT03), an ozone generator gas valve (VV1), a bypass valve (VV2), and an ozone output valve (VV3).

The air compressor 10 may compress air. The configuration of the air compressor 10 is not shown in detail, but the air compressor 10 may be provided with a dryer to dry moisture contained in the compressed air.

The air receiver tank 20 may receive compressed air from the air compressor 10 through an air line and store the compressed air. In this case, the air receiver tank 20 may be provided in singular or plural.

The oxygen generator 30 generates oxygen from air introduced from the air receiver tank 20. The oxygen generator 30 may be provided with compressed air through an air line installed between the oxygen generator 30 and the air receiver tank 20. The first pressure gauge (PT01) may be installed in the air line between the air receiver tank 20 and the oxygen generator 30. The first pressure gauge (PT01) may measure the pressure of a fluid output from the air receiver tank 20.

The air compressor 10, the air receiver tank 20, and the oxygen generator 30 may constitute a modular oxygen unit.

The oxygen receiver tank 40 may be connected to the oxygen generator 30 of the oxygen unit, and may store introduced oxygen. The stored oxygen may be introduced into the ozone generator 50 through an oxygen line connecting the oxygen receiver tank 40 and the ozone generator 50.

The second pressure gauge (PT02) may be installed in the oxygen line between the oxygen receiver tank 40 and the ozone generator 50. The second pressure gauge (PT02) may measure the pressure of a fluid output from the oxygen receiver tank 40.

The ozone generator 50 may generate ozone from oxygen introduced from the oxygen receiver tank 40. Although not shown in detail, the ozone generator 50 may include an electrode tube (not shown and the electrode tube may generate ozone through electrolysis of oxygen by applying a certain amount of current to oxygen introduced from the oxygen receiver tank 40. The ozone generator 50 may supply the generated ozone to the ozone injector (INJECT).

The ozone generator gas valve (VV1) may be installed in the oxygen line between the oxygen receiver tank 40 and the ozone generator 50. The ozone generator gas valve (VV1) may control the flow rate of oxygen supplied to the ozone generator 50.

A bypass line through which oxygen output from the oxygen receiver tank 40 bypasses the ozone generator 50 may be formed. The bypass line may send oxygen supplied from the oxygen receiver tank 40 to the output terminal of the ozone generator 50 so that the oxygen bypasses the ozone generator 50. The bypass valve (VV2) for controlling the flow rate of the ozone generator bypass line may be installed in the bypass line.

The oxygen receiver tank 40 and the ozone generator 50 may constitute a modular ozone unit.

The ozone output valve (VV3) for controlling the flow rate of ozone generated from the ozone generator 50 may be installed in an ozone line connecting the ozone generator 50 and the ozone injector (INJECT). The third pressure gauge (PT03) may be installed in the ozone line. The third pressure gauge (PT03) may measure the pressure of a fluid output from the ozone generator.

The controller 60 may receive pressure signals measured in the first to third pressure gauges (PT01, PT02, and PT03), and may control opening and closing of the ozone generator gas valve (VV1), the bypass valve (VV2), and the ozone output valve (VV3).

The ballast water pump 70 may pump ballast water and provide the ballast water to the inflow line (LINE1).

The inflow line (LINE1) may transfer ballast water from the ballast water pump 70 to the ballast water tank 80.

The ballast water tank 80 may receive ballast water from the inflow line (LINE1) and store the ballast water.

The ozone injector (INJECT) may inject ozone supplied through the ozone line into the ballast water of the inflow line (LINE1).

Ballast water stored in the ballast water tank 80 may be discharged through the discharge line (LINE2).

The neutralization device 90 may supply a neutralizing agent to the discharge line (LINE2) to neutralize residual active materials contained in ballast water discharged through the discharge line (LINE2).

The destructor 55 may purge ozone generated in the ozone generator 50. Ozone generated in the ozone generator 50 is used to sterilize ballast water. When ozone for sterilization is no longer needed, generated ozone needs to be decomposed into harmful gases and purged. Purging of ozone in the destructor 55 may be performed in a variety of known ways.

The 3-way valve (3W) may provide ozone generated in the ozone generator 50 to the ozone injector (INJET) or the destructor 55. That is, when the 3-way valve (3W) is opened in the direction of the ozone injector (INJECT), ozone may enter into the ozone injector (INJECT). When the 3-way valve (3W) is opened in the direction of the destructor 55, ozone may enter into the destructor 55.

Figure 2:
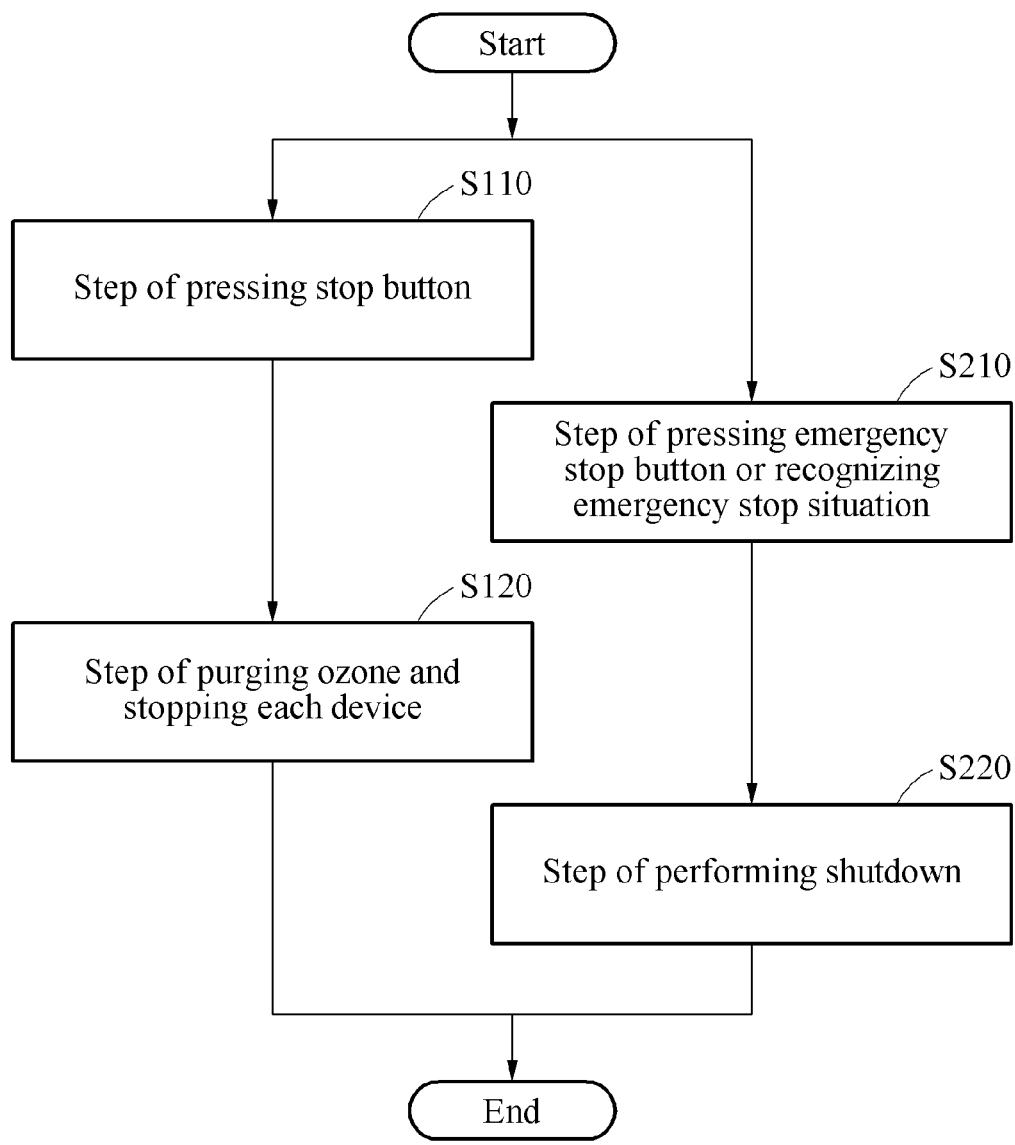
FIG. 2 is a flowchart for explaining the method of driving a ballast water treatment system shown in FIG. 1.

FIG. 2 is a flowchart for explaining the method of driving a ballast water treatment system shown in FIG. 1.

Referring to FIGS. 1 and 2, the ballast water treatment system may include an air compressor for compressing air, an air receiver tank for storing the compressed air, an oxygen generator for generating oxygen from the air, an oxygen receiver tank for storing the oxygen, an ozone generator for generating ozone from the oxygen, a ballast water pump for pumping ballast water, an inflow line for transferring the ballast water, an ozone injector for injecting the ozone into the inflow line, and a destructor for purging the ozone.

The ballast water treatment system may further include a first pressure gauge for measuring the pressure of a fluid output from the air receiver tank, a second pressure gauge for measuring the pressure of a fluid output from the oxygen receiver tank, a third pressure gauge for measuring the pressure of a fluid output from the ozone generator, an ozone generator gas valve for controlling the flow rate of the oxygen supplied from the oxygen receiver tank to the ozone generator, an ozone output valve for controlling the flow rate of the ozone supplied from the ozone generator to the inflow line, and a bypass valve for controlling the flow rate of an ozone generator bypass line that sends the oxygen supplied from the oxygen receiver tank to the output terminal of the ozone generator so that the oxygen bypasses the ozone generator.

The ballast water treatment system may further include a ballast water tank for receiving ballast water from the inflow line and storing the ballast water, a discharge line for discharging the ballast water stored in the ballast water tank, and a neutralization device for providing a neutralizing agent to the discharge line.

The method of driving a ballast water treatment system may include step S110 of pressing a stop button and step S210 of purging ozone and stopping each device. The driving method may include step S210 of pressing an emergency stop button or recognizing an emergency stop situation and step S220 of performing shutdown. According to the driving method, depending on situations, the ballast water treatment system may be stopped in different ways. That is, the system may be stopped normally when a user presses a stop button, or the system may be stopped when a user presses an emergency stop button or in the case of an emergency stop situation.

When a user stops the ballast water treatment system normally by pressing a stop button, the method of driving a ballast water treatment system may include step S110 of pressing a stop button and step S210 of purging ozone and stopping each device.

In step S110 of pressing a stop button, a user may press a stop button to stop the ballast water treatment system under normal conditions (e.g., when stopping ballasting).

In step S210 of purging ozone and stopping each device, production of ozone generated from the ozone generator may be stopped, and ozone that has previously been generated may be purged. Thereafter, each device of the ballast water treatment system may be stopped. Accordingly, it is possible to prevent damage caused by outflow of harmful ozone gas.

When a user presses an emergency stop button or in the case of an emergency stop situation, the method of driving a ballast water treatment system may include step S210 of pressing an emergency stop button or recognizing an emergency stop situation and step S220 of performing shutdown.

In step S210 of pressing an emergency stop button or recognizing an emergency stop situation, a user may determine an emergency situation and press an emergency stop button, or an emergency stop situation may be recognized by the ballast water treatment system.

In step S220 of performing shutdown, the ballast water treatment system including the ozone generator may be forcibly terminated.

Figure 3:
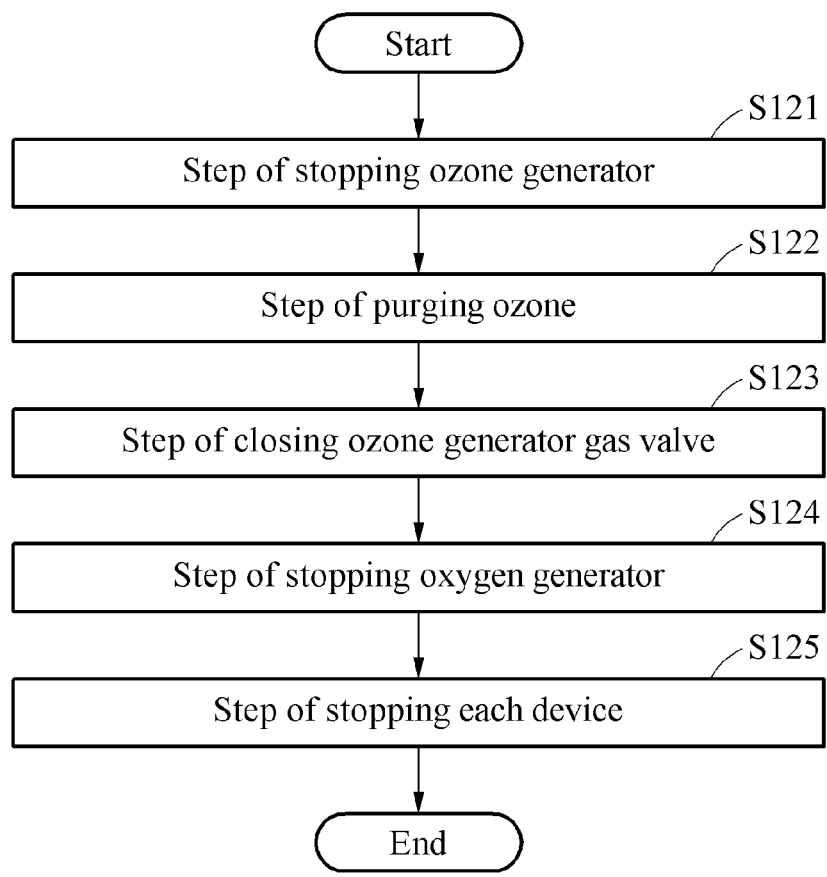
FIG. 3 is a flowchart for explaining the step of purging ozone and stopping each device of the driving method shown in FIG. 2.

FIG. 3 is a flowchart for explaining the step of purging ozone and stopping each device of the driving method shown in FIG. 2.

Step S120 of purging ozone and stopping each device may include step S121 of stopping an ozone generator, step S122 of purging ozone, step S123 of closing an ozone generator gas valve, step S124 of stopping an oxygen generator, and step S125 of stopping each device.

In step S121 of stopping an ozone generator, the ozone generator may be stopped to stop generation of ozone.

In step S122 of purging ozone, after the ozone generator is stopped, operation of purging ozone that has previously been generated may be performed. Since ozone, which is a harmful gas, may leak and cause environmental pollution, it is necessary to purge residual ozone when the ballast water treatment system is terminated or stopped.

In step S122 of purging ozone, the 3-way valve may be opened in the direction of the destructor and may be closed in the direction of the ozone injector. Accordingly, ozone generated in the ozone generator may be introduced into the destructor, and the ozone may be purged therein.

At this time, only when the measured concentration of ozone is less than a predetermined value, subsequent steps may be performed. In this case, the predetermined value may be 2 g/Nm$^3$.

In step S123 of closing an ozone generator gas valve, to prevent oxygen from being supplied to the ozone generator, the ozone generator gas valve may be closed.

In step S124 of stopping an oxygen generator, generation of oxygen may be stopped by stopping the oxygen generator. In addition, generation of compressed air may be stopped by stopping the air compressor.

After the oxygen generator and the air compressor are stopped, the pressure of air output from the air receiver tank may be measured using the first pressure gauge. Only when the pressure of air is less than a predetermined value, subsequent steps may be performed. In this case, the predetermined value may be 0.5 bar.

In addition, the pressure of oxygen output from the oxygen receiver tank may be measured using the second pressure gauge. Only when the pressure of oxygen is less than a predetermined value, subsequent steps may be performed. In this case, the predetermined value may be 0.5 bar.

In step S125 of stopping each device, each of the components of the ballast water treatment system may be stopped and terminated.

Figure 4:
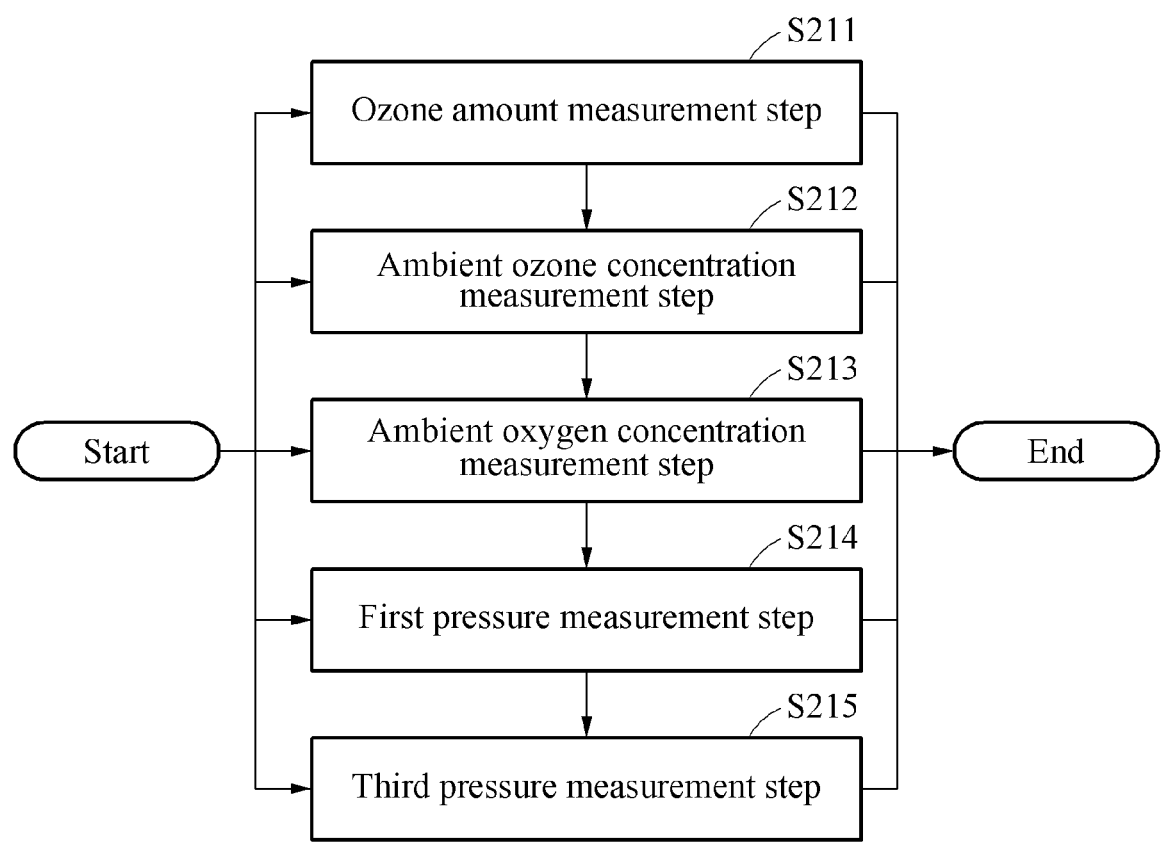
FIG. 4 is a flowchart for explaining the step of pressing an emergency stop button or the step of recognizing an emergency situation of the driving method shown in FIG. 2.

FIG. 4 is a flowchart for explaining the step of pressing an emergency stop button or the step of recognizing an emergency situation of the driving method shown in FIG. 2.

Referring to FIG. 4, in step S210 of pressing an emergency stop button or recognizing an emergency stop situation, a user may press an emergency stop button (step of pressing an emergency stop button) to proceed to the step of performing shutdown (see S220 of FIG. 2), which is a subsequent step. Alternatively, the ballast water treatment system may recognize an emergency situation (step of recognizing an emergency situation), and the step of performing shutdown, which is a subsequent step, may proceed. The step of recognizing an emergency situation may include an ozone amount measurement step (S211), an ambient ozone concentration measurement step (S212), an ambient oxygen concentration measurement step (S213), a first pressure measurement step (S214), and a third pressure measurement step (S215).

In the ozone amount measurement step (S211), the amount of ozone added to ballast water by the ozone injector may be measured. Upon determining that the amount of ozone is out of a predetermined range for more than a predetermined period of time, this situation may be recognized as an emergency situation, and the step of performing shutdown may proceed.

In this case, the predetermined period of time may be 5 minutes, and the predetermined range may be 2.1 ppm to 2.6 ppm. That is, when the amount of ozone is 2.1 ppm or less for 5 minutes or more, or when the amount of ozone is 2.6 ppm or more for 5 minutes or more, it may be judged that ozone is leaking or that an excess of ozone is being generated. Based on this, the ballast water treatment system may recognize this situation as an emergency situation.

In the ambient ozone concentration measurement step (S212), the concentration of ozone present in the atmosphere around the ballast water treatment system may be measured. When the concentration of ozone is greater than a predetermined value for more than a predetermined period of time, this situation may be recognized as an emergency situation, and the step of performing shutdown may proceed.

In this case, the predetermined period of time may be 15 seconds, and the predetermined value may be 0.2 ppm. That is, when the concentration of ozone in the atmosphere is greater than 0.2 ppm for 15 seconds or more, it may be judged that ozone is leaking and the concentration of ozone in the atmosphere is increased. Based on this, the ballast water treatment system may recognize this situation as an emergency situation.

In the ambient oxygen concentration measurement step (S213), the concentration of oxygen present in the atmosphere around the ballast water treatment system may be measured. When the concentration of oxygen is out of a predetermined range for more than a predetermined period of time, this situation may be recognized as an emergency situation, and the step of performing shutdown may proceed.

In this case, the predetermined period of time may be 15 seconds, and the predetermined range may be 17% to 25%. That is, when the concentration of oxygen in the atmosphere is 17% less for 15 seconds or more, or when the concentration of oxygen in the atmosphere is 25% or more for 15 seconds or more, it may be judged that oxygen is leaking or that an excess of oxygen is generated. Based on this, the ballast water treatment system may recognize this situation as an emergency situation.

In the first pressure measurement step (S214), the first pressure of air output from the air receiver tank may be measured using the first pressure gauge. When the pressure of air is less than a predetermined value for more than a predetermined period of time, this situation may be recognized as an emergency situation, and the step of performing shutdown may proceed.

In this case, the predetermined period of time may be 30 seconds, and the predetermined value may be 3.2 bar. That is, when the first pressure of air output from the air receiver tank is less than 3.2 bar for 30 seconds or more, it may be judged that oxygen is leaking or other problems have occurred. Based on this, the ballast water treatment system may recognize this situation as an emergency situation.

In the third pressure measurement step (S215), the third pressure of ozone output from the ozone generator may be measured using the third pressure gauge. When the pressure of ozone is out of a predetermined range for more than a predetermined period of time, this situation may be recognized as an emergency situation, and the step of performing shutdown may proceed.

In this case, the predetermined period of time may be 60 seconds, and the predetermined range may be 0.8 bar to 2 bar. That is, when the third pressure of ozone output from the ozone generator is 0.8 bar or less for 60 seconds or more, or when the third pressure of ozone output from the ozone generator is 2 bar or more for 60 seconds or more, it may be judged that ozone is leaking or that an excess of ozone is generated. Based on this, the ballast water treatment system may recognize this situation as an emergency situation.

According to embodiments of the present invention, the ballast water treatment system includes an air compressor for compressing air, an air receiver tank for storing the compressed air, an oxygen generator for generating oxygen from the air, an oxygen receiver tank for storing the oxygen, an ozone generator for generating ozone from the oxygen, a ballast water pump for pumping ballast water, an inflow line for transferring the ballast water, an ozone injector for injecting the ozone into the inflow line, and a destructor for purging the ozone. In the method of driving a ballast water treatment system, as a general case, when the ballast water treatment system is stopped by pressing a stop button, generated ozone is pureed in a predetermined order. Accordingly, the ballast water treatment system may be safely operated without problems such as leakage of ozone.

In addition, an emergency stop situation may be recognized by measuring certain factors, and the ballast water treatment system may be properly shut down when emergency stop is required, so that the ballast water treatment system may be safely operated.

Although the present invention has been described above with reference to the embodiments of the present invention, those skilled in the art may variously modify and change the present invention without departing from the spirit and scope of the present invention as set forth in the claims below.

The invention claimed is:

1. A method of driving a ballast water treatment system comprising an air compressor for compressing air; an air receiver tank for storing the compressed air; an oxygen generator for generating oxygen from the air; an oxygen receiver tank for storing the oxygen; an ozone generator for generating ozone from the oxygen; a ballast water pump for pumping ballast water; an inflow line for transferring the ballast water; an ozone injector for injecting the ozone into the inflow line; and a destructor for purging the ozone, the method comprising:

a step of pressing a stop button to stop the ballast water treatment system;
a step of purging ozone generated in the ozone generator; and
a step of stopping each device of the ballast water treatment system,
wherein the ballast water treatment system further comprises a first pressure gauge installed between the air receiver tank and the oxygen generator,
wherein the step of purging the ozone comprises:
a step of stopping generation of the ozone by stopping the ozone generator;
after the ozone generator is stopped, a step of purging the ozone generated in the ozone generator;
a step of stopping the oxygen generator;
a step of stopping the air compressor;
after the oxygen generator and the air compressor are stopped, a step of measuring a pressure of air output from the air receiver tank using the first pressure gauge, and
wherein the step of stopping each device of the ballast water treatment system is performed only when the measured pressure is less than a predetermined level.

2. The method according to claim 1, wherein the ballast water treatment system further comprises an ozone generator gas valve for controlling a flow rate of the oxygen supplied from the oxygen receiver tank to the ozone generator, and the step of purging ozone further comprises a step of closing the ozone generator gas valve.

3. The method according to claim 2, wherein the ballast water treatment system further comprises a 3-way valve for providing ozone generated in the ozone generator to the ozone injector or the destructor, and in the step of purging ozone, the 3-way valve is opened in a direction of the destructor and is closed in a direction of the ozone injector so that ozone generated in the ozone generator is introduced into the destructor and is purged.

4. The method according to claim 1, wherein the predetermined level is 0.5 bar.

5. The method according to claim 1, further comprising:
a step of recognizing an emergency stop situation; and
a step of shutting down the ballast water treatment system in a case of an emergency stop situation.

6. The method according to claim 5, wherein the ballast water treatment system further comprises a third pressure gauge for measuring a pressure of a fluid output from the ozone generator, and the step of recognizing an emergency situation comprises a step of measuring an amount of ozone added to ballast water by the ozone injector (ozone amount measurement step); a step of measuring a concentration of ozone present in an atmosphere around the ballast water treatment system (ambient ozone concentration measurement step); a step of measuring a concentration of oxygen present in an atmosphere around the ballast water treatment system (ambient oxygen concentration measurement step); a step of measuring, using the first pressure gauge, a first pressure of air output from the air receiver tank (first pressure measurement step); and a step of measuring, using the third pressure gauge, a third pressure of ozone output from the ozone generator (third pressure measurement step).

7. The method according to claim 6, wherein, in the ozone amount measurement step, upon determining that the amount of ozone is out of a predetermined range for more than a predetermined period of time, the situation is recognized as an emergency situation, and the step of performing shutdown proceeds.

8. The method according to claim 6, wherein, in the ambient ozone concentration measurement step, when the concentration of ozone is greater than a predetermined value for more than a predetermined period of time, the situation is recognized as an emergency situation, and the step of performing shutdown proceeds.

9. The method according to claim 6, wherein, in the ambient oxygen concentration measurement step, when the concentration of oxygen is out of a predetermined range for more than a predetermined period of time, the situation is recognized as an emergency situation, and the step of performing shutdown proceeds.

10. The method according to claim 6, wherein, in the first pressure measurement step, when the pressure of air is less than a predetermined value for more than a predetermined period of time, the situation is recognized as an emergency situation, and the step of performing shutdown proceeds.

11. The method according to claim 6, wherein, in the third pressure measurement step, when the pressure of ozone is out of a predetermined range for more than a predetermined period of time, the situation is recognized as an emergency situation, and the step of performing shutdown proceeds.

\* \* \* \* \*